(12) United States Patent
Arai

(10) Patent No.: US 7,849,094 B2
(45) Date of Patent: Dec. 7, 2010

(54) IMAGE PROCESSING DEVICE

(75) Inventor: Tomomi Arai, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 350 days.

(21) Appl. No.: 12/073,607

(22) Filed: Mar. 7, 2008

(65) Prior Publication Data

US 2008/0222213 A1 Sep. 11, 2008

(30) Foreign Application Priority Data

Mar. 7, 2007 (JP) ............................. 2007-057513

(51) Int. Cl.
*G06F 7/00* (2006.01)
*G06F 17/20* (2006.01)
*G06F 17/28* (2006.01)
*G06F 17/30* (2006.01)

(52) U.S. Cl. ............................. 707/756; 704/2; 704/5; 704/8

(58) Field of Classification Search ........................ None
See application file for complete search history.

(56) References Cited

U.S. PATENT DOCUMENTS

| 5,956,487 | A | 9/1999 | Venkatraman et al. | |
| 6,170,007 | B1 | 1/2001 | Venkatraman et al. | |
| 7,373,347 | B2* | 5/2008 | Takahashi et al. | ............. 707/10 |
| 7,418,390 | B1* | 8/2008 | Jokipii | .................... 704/270.1 |
| 2001/0025307 | A1 | 9/2001 | Venkatraman et al. | |
| 2001/0034777 | A1 | 10/2001 | Venkatraman et al. | |
| 2001/0034778 | A1 | 10/2001 | Venkatraman et al. | |
| 2001/0034779 | A1 | 10/2001 | Venkatraman et al. | |
| 2001/0034780 | A1 | 10/2001 | Venkatraman et al. | |
| 2001/0034781 | A1 | 10/2001 | Venkatraman et al. | |
| 2001/0044836 | A1 | 11/2001 | Venkatraman et al. | |
| 2002/0133636 | A1 | 9/2002 | Venkatraman et al. | |
| 2003/0099374 | A1* | 5/2003 | Choi et al. | ................... 382/100 |
| 2003/0191817 | A1* | 10/2003 | Fidler | ......................... 709/219 |
| 2003/0208558 | A1 | 11/2003 | Venkatraman et al. | |
| 2008/0270113 | A1* | 10/2008 | Jokipii | ......................... 704/4 |

FOREIGN PATENT DOCUMENTS

| JP | 10-149270 | 6/1998 |
| JP | 2000-330992 | 11/2000 |
| JP | 2002-251261 | 9/2002 |
| JP | 2004-227351 | 8/2004 |
| JP | 2005-267571 | 9/2005 |
| JP | 2006-135774 | 5/2006 |

* cited by examiner

*Primary Examiner*—Neveen Abel Jalil
*Assistant Examiner*—Patrick A Darno
(74) *Attorney, Agent, or Firm*—Banner & Witcoff, LTD.

(57) ABSTRACT

An image processing device which is provided with a communication unit configured to communicate with an information processing device, and a web server unit configured to generate a webpage which can be browsed by a web browser executed in the information processing device and transmit the generated webpage to the information processing device. The web server unit includes an information acquiring unit configured to acquire language information of the web browser, a designating unit configured to insert designation of a character code set corresponding to the language information acquired by the information acquired by the language information acquiring unit in the webpage, and an incorporating unit configured to incorporate language information acquired from the image processing device into a text of the webpage.

14 Claims, 5 Drawing Sheets

```
<!DOCTYPE HTML PUBLIC "-//W3C//DTD HTML 4.01 Frameset//EN">
<HTML>
<HEAD>
<META HTTP-EQUIV="Content-Type" CONTENT="text/html; charset=ISO-8859-1">
<TITLE>Brother Printer</TITLE>
<SCRIPT LANGUAGE="JavaScript1.2"><!--

...

//--></SCRIPT>
</HEAD>
```

GET /printer/main.html HTTP/1.1
Accept: text/html, image/png, image/jpeg, image/gif, image/x-xbitmap, */*
Accept-Language: ja
Accept-Encoding: *
Accept-Charset: *
User-Agent: Mozilla/4.0
Connection: keep-alive

FIG. 5

```
<!DOCTYPE HTML PUBLIC "-//W3C//DTD HTML 4.01 Frameset//EN">
<HTML>
<HEAD>
<META HTTP-EQUIV="Content-Type" CONTENT="text/html; charset=Shift_JIS">
<TITLE>Brother Printer</TITLE>
<SCRIPT LANGUAGE="JavaScript1.2"><!--

...

//--></SCRIPT>
</HEAD>
```

FIG. 6

IMAGE PROCESSING DEVICE

CROSS-REFERENCE TO RELATED APPLICATION

This application claims priority under 35 U.S.C. §119 from Japanese Patent Application No. 2007-057513 filed on Mar. 7, 2007. The entire subject matter of the application is incorporated herein by reference.

BACKGROUND

1. Technical Field

The following description relates to an image processing device having a web server function.

2. Related Art

Conventionally, there is known an image processing device such as a printer, a copier and a facsimile machine configured to be connectable with a computer. Among such image processing devices, there are known ones having embedded web server function. An example of such a device is disclosed in Japanese Patent Provisional Publication No. HEI 10-149270. By utilizing such a web server function, when a user designate an address of an image processing device through a web browser on the computer, a webpage created in the image processing device is transmitted to the computer and is displayed on the web browser. On the webpage as transmitted, an operational status, log information, setting information of the image processing device are displayed.

There are cases where characters the user arbitrarily input (e.g., a location of the image processing device or user's comments) are displayed on the webpage. Specifically, for example, the user may input characters in an input box provided on the webpage and operates to transmit the same. Then, the character information representing the characters input in the input box is transmitted to the image processing device. The image processing device receives the character information and incorporates the same in the webpage, and transmits the webpage to the computer. As a result, the characters input in the input box are displayed on the web browser as a part of the webpage.

Such an image processing device may be configured such that a display language of the webpage can be switched among a plurality of languages such as English, French, German and the like, in order to use the same product having a single specification in various countries. In such a case, when the image processing device is used under a linguistic circumstance which is not supported by the web server function of the image processing device, English is typically used as the display language of the webpage.

SUMMARY OF THE INVENTION

When the webpage of the image processing device which dose not support the Japanese is displayed on the browser of a computer operating under Japanese language environment, the image processing device is set up to display the English webpage. Generally, the English webpage (e.g., HTML format page) is configured such that a character code set (ISO-8859-1 (Latin-1)) is designated in a tag, and the text of the webpage is displayed using the designated character code set.

However, when the log information including a name of a printed file, a name of a user who executed the printing operation or the like is displayed on the webpage, if the log information includes a character which is not supported by the designated character code set (e.g., Japanese characters), the characters are displayed as illegible characters. Similarly, when characters input through the input box of the webpage are displayed on the webpage, if the input characters include characters which are not supported by the designated character code set, the input characters will be displayed as illegible characters.

In consideration of the above problem, the present invention is advantageous in that an improved image processing device is provided, with which the above-described problem of displaying the illegible characters on the webpage which is displayed by the web server of the computer can be prevented.

According to aspects of the invention, there is provided an image processing device which is provided with a communication unit configured to communicate with an information processing device, and a web server unit configured to generate a webpage which can be browsed by a web browser executed in the information processing device and transmit the generated webpage to the information processing device. The web server unit includes an information acquiring unit configured to acquire language information of the web browser, a designating unit configured to insert designation of a character code set corresponding to the language information acquired by the information acquired by the language information acquiring unit in the webpage, and an incorporating unit configured to incorporate language information acquired from the image processing device into a text of the webpage.

According to another aspect of the invention, there is provide with a method of controlling an image processing device which is provided with a communication unit configured to communicate with an information processing device, and a web server unit configured to generate a webpage which can be browsed by a web browser executed in the information processing device and transmit the generated webpage to the information processing device. The method includes the steps of acquiring language information of the web browser, designating a character code set corresponding to the language information acquired by the step of acquiring the language information, and incorporating the language information into a text of the webpage.

According to a further aspect of the invention, there is provided with a computer accessible recording medium containing a program to be executed by a computer of an image processing device provided with a communication unit configured to communicate with an information processing device, and a web server unit configured to generate a webpage which can be browsed by a web browser executed in the information processing device and transmit the generated webpage to the information processing device. The program causes the computer, when executed, to perform the steps of acquiring language information of the web browser, designating a character code set corresponding to the language information acquired by the step of acquiring the language information, and incorporating the language information into a text of the webpage.

According to the above configurations, even if the character code set of the language which is not supported by the function of the web server, the characters can be legibly displayed on the webpage, which is displayed by the web browser on the computer.

BRIEF DESCRIPTION OF THE ACCOMPANYING DRAWINGS

FIG. 5 shows an example of a header section of the http request.

FIG. 6 shows another example of a source of a webpage.

DETAILED DESCRIPTION OF THE EMBODIMENT

Hereinafter, referring to the accompanying drawings, an embodiment according to the invention will be described in detail.

Figure 1:
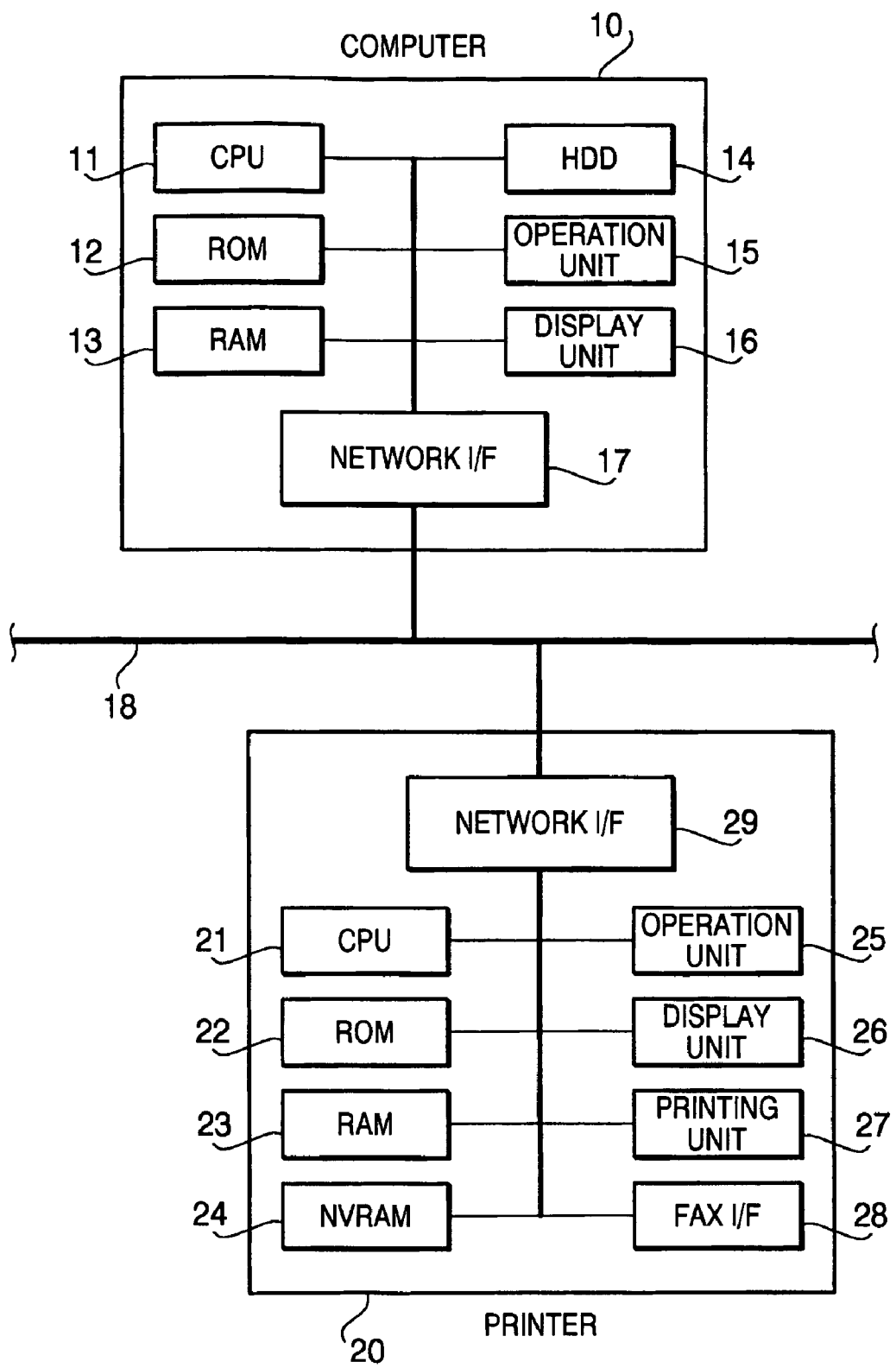
FIG. 1 is a block diagram showing configurations of a printer and a computer according to an embodiment of the present invention.

FIG. 1 is a block diagram showing a configuration of a printer 20 which is an example of an image processing device according to an embodiment of the present invention, and a computer 10 which is connected with the printer 20 via a network.

The computer 10 is provided with a CPU (Central Processing Unit) 11, a ROM (Read Only Memory) 12, a RAM (Random Access Memory) 13, an HDD (Hard Disk Drive) 14, an operation unit 15 including a keyboard and a pointing device such as a mouse, a display unit 16 including an LCD (Liquid Crystal Display), a network interface 17 which is connected with a communication line 18. The HDD 14 stores various programs realizing a web browser and a printer driver.

The printer 20 is provided with a CPU 21, a ROM 22, a RAM 23, an NVRAM (Non-Volatile RAM) 24, an operation unit 25, a display unit 26, a printing unit 27, a facsimile interface 28 and a network interface 29.

The ROM 22 stores programs realizing a web server function and a database. The ROM 22 further stores various programs for controlling the operation of the printer 20. Specifically, the CPU 21 reads the various programs and controls the operation of the printer 20 with storing various pieces of data in the RAM 23 and the NVRAM 23.

The operation unit 25 is provided with a plurality of buttons which allows a user to input various commands such as a print request command to start a printing operation. The display unit 26 is provided with the LCD (Liquid Crystal Display) and indication lamps, and capable of displaying various setting items and operational states. The printing unit 27 is configured to print images on recording sheets (not shown) based on print data. The facsimile interface 28 is connected to a telephone line (not shown), and the printer 20 is capable of exchanging facsimile data with an external facsimile machine (or a device having a facsimile function) through the facsimile interface 28 and the telephone line. The network interface 29 is connected with an external computer 10 through the communication line 18 so that data communication between the printer 20 and the computer 10 can be performed.

Next, an EWS (Embedded Web Server) function implemented in the printer 20 will be described.

When the user starts the web browser on the computer 10 and inputs a URL (Uniform Resource Locator) corresponding to the printer 20, the CPU 11 transmits an HTTP request to the printer 20 through the network I/F 17. In response to the HTTP request from the computer 10, the CPU 21 of the printer 20 dynamically creates a webpage in HTML format with a web server program and CGI program (which will be described later), and returns the thus created webpage to the computer 10 as an HTTP response. The CPU 11 of the computer 10 receives the HTTP response and display the webpage on the display unit using the web browser.

Figure 2:
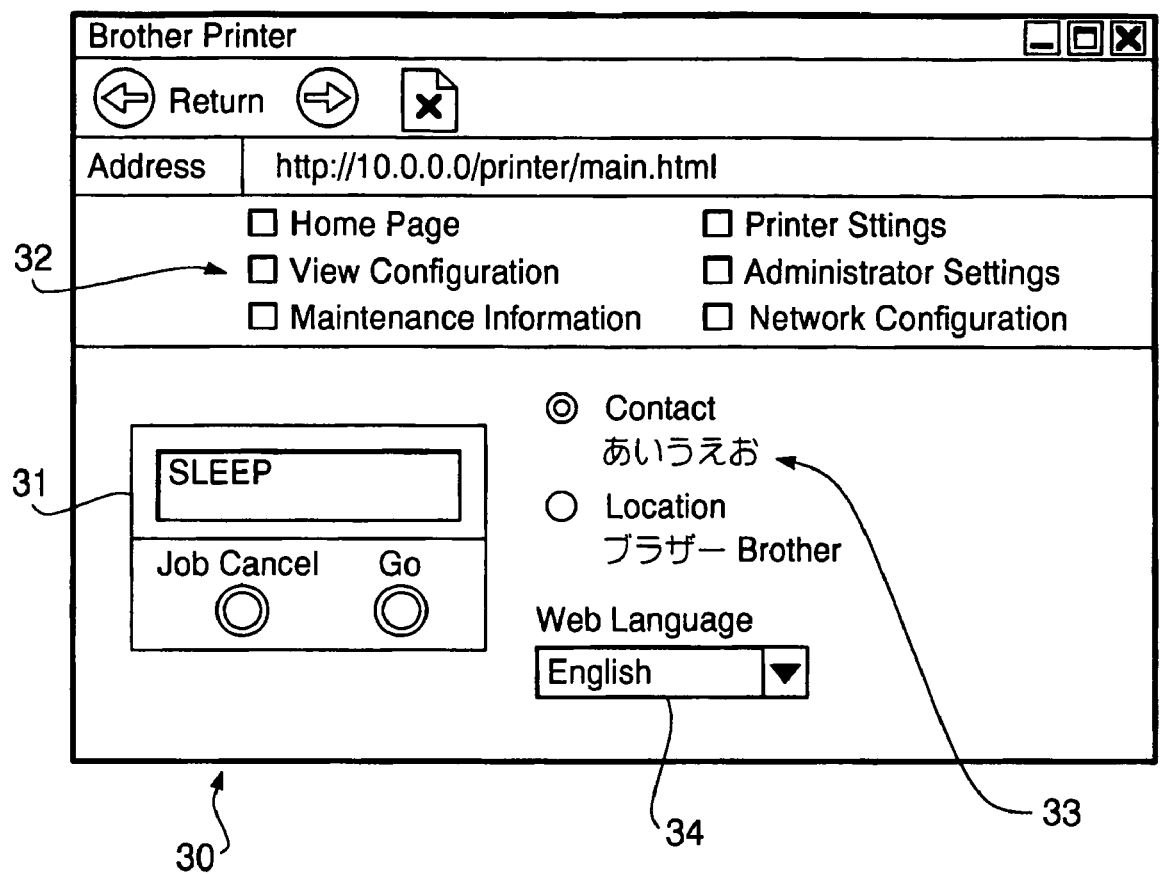
FIG. 2 shows an example of a displayed webpage according to the embodiment of the invention.

FIG. 2 shows an example of a webpage window 30 displayed, by the web browser, on the display unit 16 of the computer 10. The webpage window 30 includes an operational status displaying section 31 for displaying a current operational status of the printer 20, a link section 32 for displaying various setting items (e.g., View Configuration), a contact information displaying section 33 and a pull-down menu 34 for setting a language to be used as "Language of Web Browser" (described later).

The web server embedded in the printer 20 is capable of creating a webpage window 30 with selecting one of a plurality of languages, which may include English, French, German, Spanish, Italy, etc. That is, the web server is capable of create webpages of respective language versions. It should be noted that the language (i.e., the characters) acquired from an information processing device, which will be described later, are displayed as they regardless of the language used for creating the webpage. Hereinafter, the languages which are incorporated in the webpage, when created, will be referred to as a description language.

The ROM 22 of the printer 20 stores a database containing information (i.e., character codes) of a text (e.g., "Home Page") for each of the usable languages. Further, for Japanese and Chinese languages, the ROM 22 stores each language (i.e., a language code defined by ISO-639) and a name of the character code set corresponding to the language in a related manner (e.g., "en" which represents English corresponds to "ISO-8859-1", and "ja" which represents Japanese corresponds to "Shift_JIS."

The menu 34 of the webpage screen 30 has items "Language of Printer" and "Language of Browser" as well as items corresponding to the usable languages (e.g., "English", "French" etc.). The user can select one of the above items by operating the operation unit 35.

When one of the items is selected through the menu 34, the web browser transmits a setting value corresponding to the selected item to the printer 20. Specifically, the web browser adds a character string representing the setting value (e.g., "en") at the end of the URL of the printer 20 (e.g., "http://10.0.0.0/printer/main.html?lang=en") and transmits an HTTP request including the above URL. In response to receipt of the HTTP request from the computer 10, the CPU 21 of the printer 20 stores the same in the NVRAM 24 as used language designating information.

Figures 3, 4:
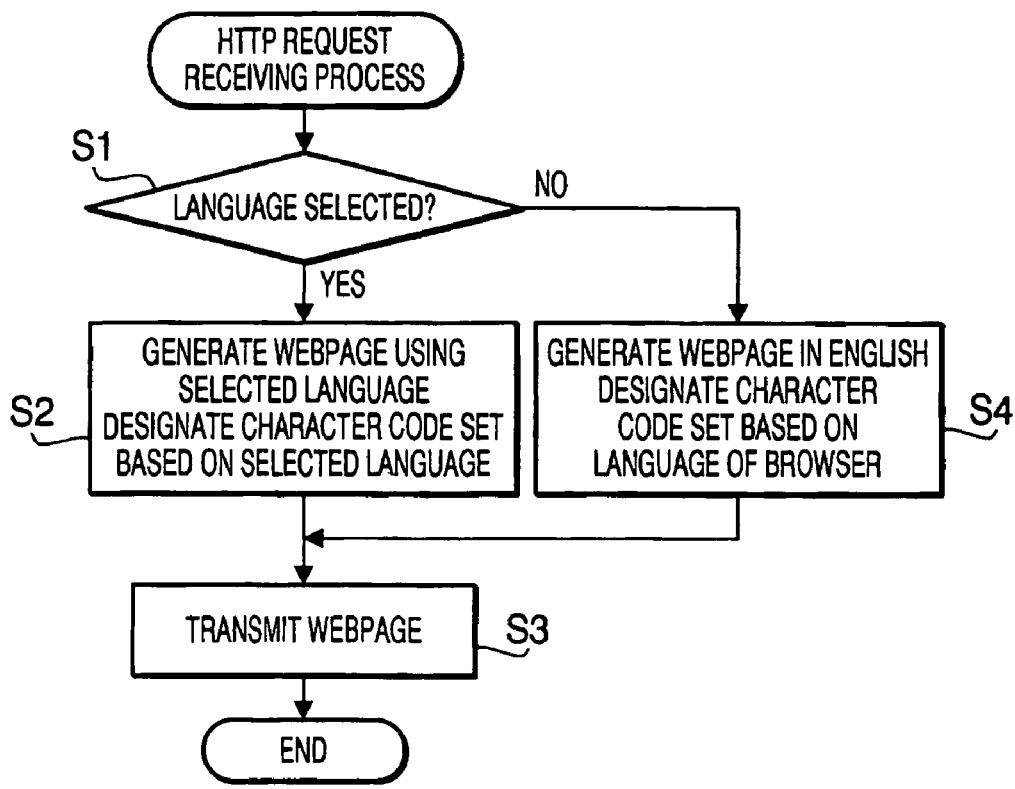
FIG. 3 is flowchart illustrating an http request receiving process.
FIG. 4 shows an example of a source of a webpage.

FIG. 3 shows a flowchart illustrating an HTTP request receiving process which is executed by the CPU 21. The HTTP request receiving process is started in response to receipt of the HTTP request. FIG. 4 shows an example of a source of an HTML file representing a webpage (a part of a header section thereof).

The CPU 21 makes the web server program reside in order to monitor receipt of the HTTP request. In response to receipt of the HTTP request, the web server program transfers the content of the HTTP request to a CGI (Common Gateway Interface) program and the following process is executed.

The CPU 21 refers to the used language designating information and judges whether a language (e.g., English) to be used is selected (S1). If one of the usable language is set (S1: YES), the CPU 21 executes a first mode process for generating a webpage using the set language (which will be referred to as a selected language) in S2. In the first mode process, the CPU 21 inserts designation of a character code set corresponding to the selected language in the head section of the webpage. For example, if the selected language is English, as shown in FIG. 4, a meta tag designating "ISO-8859-1" as a character-code set is inserted. Then, the CPU 21 retrieves character information (character code) corresponding to the selected language as a text to be displayed on the webpage screen, and incorporate the character information in the text of the webpage.

According to the printer 20, the language to be used for displaying the texts as the operation menus or messages on the display unit 26 can be selected from among the usable languages. The selected language is stored in the NVRAM 24 as the language of printer. If the item of "Language of Printer" is selected through the menu 24 of the webpage window 30, the CPU 21 refers to the language of the printer stored in the NVRAM 24 and executes the first mode process (S1: YES; S2) similarly to a case where the language is selected for the webpage.

The CGI program transfers the webpage generated as above to the web server program, and the web server program transmits the webpage as the HTTP response to the computer 10 (S3).

If, for example, the printer 20 having the web server function, which includes French as its usable languages, is to be connected to the computer 10 having a French language environment (e.g., when font data corresponding to French is installed in the OS of the computer, and the web browser of the computer is configured to display texts in French), the "French" is selected from the menu 34 of the webpage screen 30 as the selected language. Then, in the header section of the webpage, the character code set corresponding to the French is designated, and the texts are written using the characters included in the designated character code set. Therefore, such texts will be legibly displayed on the web browser.

When the CPU 21 refers to the language designation information in S1, if the "Language for Browser" is the set language (S1: NO), the CPU 21 executes a second mode process for generating the webpage in English (S4). In the second mode process, the CPU 21 refers to the language information included in the head section of the HTTP request received by the web server program. In the header section of the HTTP request, as shown in FIG. 5 for example, pieces of information such as "Accept," "Accept-Charset," "User-Agent," and "Connection" are included, and in the above case, the value of "Accept-Language" (i.e., the code of the language) is acquired as the language information for the web browser. Then, the CPU 21 acquires the character code set corresponding to the language information (i.e., the character code) for the web browser referring to the database in the ROM 22, and inserts a designation of the character code set in the header section of the webpage. Texts are displayed on the webpage window 30 in English using characters included in the ASCII characters (American Standard Code for Information Interchange). Then, the web server program transmits the thus generated webpage to the computer 10 as the HTTP response (S3).

For example, when the printer 20 having the web server function which does not included Japanese as its usable language is to be connected to the computer 10 operating in the Japanese language environment, the user selects the "Language of Browser" in the menu 34 of the webpage screen 30. In this case, the value of the information of the language of browser is "ja" which represents Japanese language. Then, the CPU 21 inserts designation of the character code set of "Shift_JIS" in the meta tag of the header section and writes the text in the webpage (e.g., "HOME PAGE" and the like) using the ASCII characters and in English. It should be noted that the ASCII characters are commonly used in various character code sets including the "Shift_JIS" character code set, therefore, it is very likely that the texts using the ASCII character set will be displayed legibly on the web browser.

Figure 7:
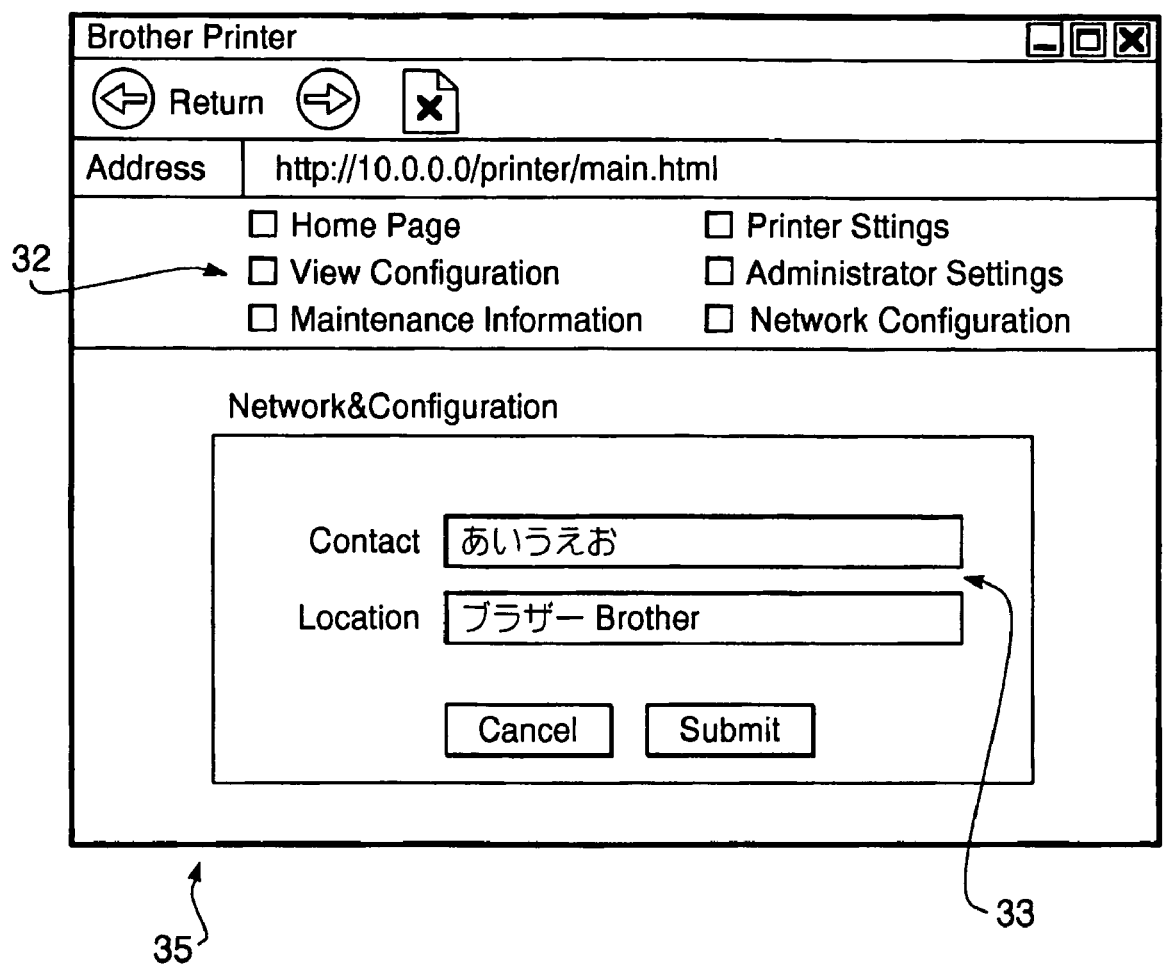
FIG. 7 shows an example of a displayed webpage.

As shown in FIG. 2, in the contact information section 33, characters input by the user for each of the items "Contact" and "Location" are displayed. FIG. 7 shows the webpage screen 35 in which the input sections 36 for allowing the user to input the contact and location information are provided. When the user input information in these input sections 36 and performs the data transmission operation, the web browser applies URL encoding to the input information (i.e., character codes), and transmits the HTTP request including the character information to the printer 20. The web server program of the printer 20, upon receipt of the HTTP request, transmits the character information included in the HTTP request to the CGI program. The CGI program decodes the transmitted character codes and stores the character information as decoded in the NVRAM 24.

The CGI program of the printer 20 acquires the character information (character codes) of the "Contact" and "Location" information stored in the NVRAM 24 when generating the webpage screen 30 shown in FIG. 2, and incorporates the acquired character information in the text of the webpage. If the character code set corresponding to English (e.g., "ISO-8859-1") is designated in the header section of the webpage, while the characters incorporated in the webpage include Japanese characters as shown in FIG. 7 (i.e., the characters which are not included in the designated character code set), the characters will be illegible on the webpage screen 30. In contrast, according to the printer 20, by setting the "Language of Browser" with the menu 34 of the webpage screen 30, the character code set corresponding to the information of the language of browser (e.g., "Shift-JIS" for Japanese) is designated in the webpage, the characters acquired through the input sections 36 are legibly displayed on the web browser as shown in FIG. 2.

On the webpage screen of the printer 20, log information regarding a print job can be displayed. The printer driver, which is a program, executed by the CPU 11 of the computer 10, is configured such that, when a file is designated to be printed and a print request command is input through the operation unit 15, the name of the print job (e.g., the file name of the file subject to be printed), and the character information (i.e., character codes) of the user name (or a log-in name) on the computer 10 are transmitted to the printer 20 together with the print request command and the print data.

The CPU 21 of the printer 20 controls the print unit 27 to execute printing based on the print data when the print request command is received from the computer 10. Further, the CPU 21 acquires the characters representing the print job name and the user name from the character information received together with the print request, and stores the acquired information in the NVRAM 24 together with the date and result of printing as the log information. If a link to a page for displaying the log information is designated on the web browser of the computer 10, the web browser transmits an HTTP request including the URL of the current page. Then, the web server of the printer 20 acquires the log information from the NVRAM 24 and incorporates the character information such as the print job name and the user name in the text of the webpage.

For example, if the computer 10 operates in the Japanese language environment, the character information incorporated in the log information as the print job name (or print file name) may include characters of the Japanese character set. In such a case, according to the printer 20, since the character code set corresponding to the information of the language of browser is designated in the webpage, as shown in FIG. 2, by selecting the "Language of Browser" in the menu 34 of the webpage window 30, the characters acquired as the print job name can be legibly displayed on the web browser.

According to the above-described exemplary embodiment, the CPU 21 of the printer 20 acquires the information of the language of web browser and inserts the designation of the character code set corresponding to the language information, and incorporates the character information acquired from the computer 10 in the text of the webpage. Since the designation of the character code set corresponding to the information of the language of browser is inserted in the webpage, even if the character code set of the language which is not supported by the function of the web server (i.e., within the language information incorporated in the webpage generated by the web server), such characters can be legibly displayed.

Further, the CPU 21 of the printer 20 is capable of executing the first mode process and the second mode process. When printer 20 operates under the language environment supported by the web server function, by executing the first mode, the text of the webpage can be displayed using the language in a language selected from among a plurality of languages. If the language environment is not supported by the web server function, the printer 20 is controlled to operate in the second mode. In such a case, in the webpage, the character code set corresponding to the information of the language of web browser is set, that is, any one of various character code sets could be selected. However, the text of the webpage is written using the ASCII characters which is of a common character code set including the common characters used in various character code sets. Therefore, the characters are legibly displayed.

Further, when the log information including the file name and user name are incorporated in the webpage and displayed, even if the log information includes characters of the language which is not supported by the web server function, the characters can be legibly displayed.

Furthermore, when the character information input on the web browser is incorporated in the text of the webpage and displayed, even if the characters which are not supported by the web server function are included in the character information, such character information can be legibly displayed.

It should be appreciated that the present invention need not be limited to the configuration of the above-identified exemplary embodiment, and configurations can be modified in various ways without departing from the gist of the invention.

For example, the CPU 21 of the printer 20 may automatically judge whether the language environment of the image processing device is supported by the web server function, and execute an appropriate process corresponding to the judgment. That is, when the webpage is to be generated, the CPU 21 may check the information of the language of browser. If the language is supported by the web server function (i.e., displayable language), the character code set corresponding to the language may be designated in the webpage, and the text of the webpage is written using the designated character code set. If the language is not supported by the web server function, a character code set corresponding to the information of the language of web browser may be designated, and the text may be written in English using the ASCII characters.

In the exemplary embodiment, the webpage is generated in HTML. However, this can be modified such that another format such as XHTML or XML format may be employed.

What is claimed is:

1. An image processing device, comprising:
    a communication unit configured to communicate with an information processing device;
    a web server unit configured to generate a webpage which can be browsed by a web browser executed in the information processing device and transmit the generated webpage to the information processing device,
    wherein the web server unit is configured to, upon execution of computer readable instructions:
        receive a webpage request from the information processing device;
        determine whether the webpage request includes a user selection of a specific language for the webpage from a plurality of languages, each of the plurality of languages corresponding to a different language character code set of a plurality of language character code sets;
        in response to determining that the webpage request includes a user selection of a specific language, operate in a first mode in which the web server unit incorporates text of the specific language selected from the plurality of languages into the webpage using characters of a first character code set corresponding to the specific language; and
        in response to determining that the webpage request does not include a user selection of a specific language, operate in a second mode in which the web server unit:
            acquires language information of the web browser;
            inserts a designation of a second character code set corresponding to the language information of the web browser in the webpage, wherein the second character code set further corresponds to a first language; and
            incorporates text of a second language into the webpage using a character set common to the plurality of language character code sets.

2. The image processing device according to claim 1, wherein, when the web server unit operates in the second mode, the web server unit creates the text of the webpage in English, using ASCII characters as the common character set.

3. The image processing device according to claim 1, further comprising:
    a printing unit configured to print an image based on a file received from the image processing device via the communication unit; and
    a log information storage configured to store a log file comprising information defining a process by which the file is printed by the printing unit,
    wherein the web server unit acquires the log information from the log information storage, and
    wherein the web server incorporates the log information in the text of the webpage.

4. The image processing device according to claim 1, further comprising an input information storage,
    wherein the web server unit acquires character information input on the web browser via the communication unit and stores the acquired character information in the input information storage, and
    wherein the web server unit incorporates the character information in the text of the webpage.

5. The image processing device of claim 1, wherein the user selected specific language is specified in the webpage request as part of an address for the information processing device when the request includes a user selection of a specific language, and
    wherein the first language is designated in a header of the webpage request when the request does not include a user selection of a specific language.

6. The image processing device of claim 1, wherein the web server unit is further configured to incorporate additional text into the webpage, wherein the additional text includes a character string acquired from the information processing device.

7. A method of controlling an image processing device which is provided with a communication unit configured to communicate with an information processing device, and a web server unit configured to generate a webpage which can be browsed by a web browser executed in the information processing device and transmit the generated webpage to the information processing device, the method comprising steps of:
- receiving a webpage request from the information processing device;
- determining whether the webpage request includes a user selection of a specific language for the webpage from a plurality of languages, each of the plurality of languages corresponding to a different language character code set of a plurality of language character code sets;
- in response to determining that the webpage request includes a user selection of a specific language, operating in a first mode in which the text of the webpage is incorporated using characters of a first character code set corresponding to the specific language selected from among the plurality of languages; and
- in response to determining that the webpage request does not include a user selection of a specific language, operating in a second mode comprising:
  - acquiring language information of the web browser;
  - inserting a designation of a second character code set corresponding to the language information of the web browser in the webpage, wherein the second character code set further corresponds to a first language; and
  - incorporating text of a second language into the webpage using a character set common to the plurality of language character code sets.

8. The method according to claim 7, wherein, when the web server unit operates in the second mode, the second language is English, and the character set common to the character code sets is ASCII.

9. The method according to claim 7, wherein the image processing device further includes:
- a printing unit configured to print an image based on a file received from the image processing device via the communication unit; and
- a log information storage configured to store a log file comprising information defining a process by which the file is printed by the printing unit, and
- wherein the method further comprises:
  - acquiring the log information from the log information storage, and
  - incorporating the log information in the text of the webpage.

10. The method according to claim 7, wherein the image processing device further includes an input information storage, and wherein the method further comprises:
- acquiring character information input on the web browser via the communication unit and storing the acquired character information in the input information storage, and
- incorporating the character information in the text of the webpage.

11. A non-transitory computer accessible recording medium storing a program to be executed by a computer of an image processing device provided with a communication unit configured to communicate with an information processing device, and a web server unit configured to generate a webpage which can be browsed by a web browser executed in the information processing device and transmit the generated webpage to the information processing device, the program causes the computer, when executed, to perform steps of:
- receiving a webpage request from the information processing device;
- determining whether the webpage request includes a user selection of a specific language for the webpage from a plurality of languages, each of the plurality of languages corresponding to a different language character code set of a plurality of language character code sets;
- in response to determining that the webpage request includes a user selection of a specific language, operating in a first mode in which the text of the webpage is incorporated using characters of a first character code set corresponding to the specific language selected from among the plurality of languages; and
- in response to determining that the webpage request does not include a user selection of a specific language, operating in a second mode comprising:
  - acquiring language information of the web browser;
  - inserting a designation of a second character code set corresponding to the language information of the web browser in the webpage, wherein the second character code set further corresponds to a first language; and
  - incorporating text of a second language into the webpage using a character set common to the plurality of language character code sets.

12. The non-transitory computer accessible recording medium according to claim 11, wherein, when the web server unit operates in the second mode, the second language is English and the character set common to the character code sets is ASCII.

13. The non-transitory computer accessible recording medium according to claim 11, wherein the image processing device further includes:
- a printing unit configured to print an image based on a file received from the image processing device via the communication unit; and
- a log information storage configured to store a log file comprising information defining a process by which the file is printed by the printing unit, and
- wherein the program further causes the computer to perform steps of:
  - acquiring the log information from the log information storage, and
  - incorporating the log information in the text of the webpage.

14. The non-transitory computer accessible recording medium according to claim 11, wherein the image processing device further includes an input information storage, and wherein the program further causes the computer to perform steps of:
- acquiring character information input on the web browser via the communication unit and storing the acquired character information in the input information storage, and
- incorporating the character information in the text of the webpage.

* * * * *